(12) United States Patent
Begole et al.

(10) Patent No.: US 8,832,546 B2
(45) Date of Patent: Sep. 9, 2014

(54) SYSTEM FOR AUTOMATICALLY FILLING IN PAPER FORMS WITH ELECTRONIC DATA

(75) Inventors: James M. A. Begole, Los Altos, CA (US); Maurice K. Chu, Burlingame, CA (US); Kurt E. Partridge, Palo Alto, CA (US); Robert T. Krivacic, San Jose, CA (US); Mary C. McCorkindale, Fairport, NY (US)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 311 days.

(21) Appl. No.: 13/040,178

(22) Filed: Mar. 3, 2011

(65) Prior Publication Data

US 2012/0226969 A1 Sep. 6, 2012

(51) Int. Cl.
*G06F 17/24* (2006.01)
(52) U.S. Cl.
CPC .................................... *G06F 17/243* (2013.01)
USPC ........................................................ 715/226

(58) Field of Classification Search
CPC ...................................................... G06F 17/243
USPC ............................................................ 715/226
See application file for complete search history.

(56) References Cited

U.S. PATENT DOCUMENTS

| 5,822,454 A | * | 10/1998 | Rangarajan ................... 382/180 |
| 2005/0289114 A1 | * | 12/2005 | Bellamy ........................... 707/2 |
| 2011/0271173 A1 | * | 11/2011 | Ait-Mokhtar et al. ........ 715/226 |

* cited by examiner

*Primary Examiner* — Doug Hutton, Jr.
*Assistant Examiner* — Tionna Burke
(74) *Attorney, Agent, or Firm* — Shun Yao; Park, Vaughan, Fleming & Dowler LLP

(57) ABSTRACT

Embodiments of the disclosed technology provide a system and method for automatically filling paper form with electronic data. The system receives from a user a scanned image of a paper form that includes a plurality of fields. The system then retrieves a schema map that maps the plurality of fields in the paper form to a plurality of fields in an electronic data record associated with the user. Next, the system retrieves data values of the fields in the electronic data record based on the schema map. The system also synthesizes the retrieved data values and the scanned image to create an image of the paper form in which the fields are filled with the retrieved data values.

18 Claims, 6 Drawing Sheets

PATIENT INFORMATION — 200

PATIENT NAME: (210) _____ DATE: (220) _____
   LAST (240)        FIRST          MI (230) ☐ MALE ☐ FEMALE  ☐ MARRIED ☐ SINGLE ☐ OTHER: _____

SOCIAL SECURITY #: _____ BIRTH DATE: _____

PHONE HOME _____ WORK _____ CELL _____

EMAIL: _____

HOME ADDRESS: _____
            STREET                              APARTMENT #
            _____
            CITY              STATE          ZIP CODE

HEALTH INFORMATION

DATE OF LAST DENTAL VISIT: (270) _____ 250   REASON FOR THIS VISIT? (260) _____

HAVE YOU EVER HAD ANY OF THE FOLLOWING? PLEASE READ THIS CAREFULLY AND CIRCLE Y FOR "YES" AND N FOR "NO":

| | | | | | | |
|---|---|---|---|---|---|---|
| AIDS/HIV | Y N | HEAD INJURIES | Y N | RADIATION TREATMENT | Y N | PENICILLIN ALLERGY Y N |
| ANEMIA | Y N | HEART DISEASE | Y N | RESPIRATORY PROBLEMS | Y N | ANESTHETIC ALLERGY Y N |
| ARTHRITIS | Y N | HEART MURMUR | Y N | RHEUMATIC FEVER | Y N | |
| ARTIFICIAL JOINTS | Y N | HEPATITIS | Y N | RHEUMATISM | Y N | LATEX ALLERGY Y N |
| ASTHMA 290 | Y N | HIGH BLOOD PRESSURE | Y N | SINUS PROBLEMS | Y N | OTHER ALLERGIES _____ |
| BLOOD DISEASE | Y N | JAUNDICE | Y N | STOMACH PROBLEMS | Y N | _____ |
| CANCER 280 | Y N | KIDNEY DISEASE | Y N | STROKE | Y N | OTHER |
| DIABETES | Y N | LIVER DISEASE | Y N | THYROID DISORDER | Y N | ☐ _____ |
| DIZZINESS | Y N | PSYCHIATRIC TREATMENT | Y N | TUBERCULOSIS | Y N | |
| EPILEPSY | Y N | NERVOUS DISORDERS | Y N | TUMORS/CYSTS | Y N | ☐ _____ |
| EXCESSIVE BLEEDING | Y N | PACEMAKER | Y N | VENEREAL DISEASE | Y N | |
| FAINTING | Y N | PREGNANCY | Y N | ALLERGIES | | |
| GLAUCOMA | Y N | DUE DATE: | | CODEINE ALLERGY | Y N | |

• HAVE YOU EVER HAD ANY COMPLICATIONS FOLLOWING DENTAL TREATMENT? ☐ YES ☐ NO
   IF YES, PLEASE EXPLAIN _____

• HAVE YOU EVER BEEN ADMITTED TO A HOSPITAL OR NEEDED EMERGENCY CARE DURING
   THE PAST TWO YEARS?   ☐ YES ☐ NO
   IF YES, PLEASE EXPLAIN _____

FIG. 2

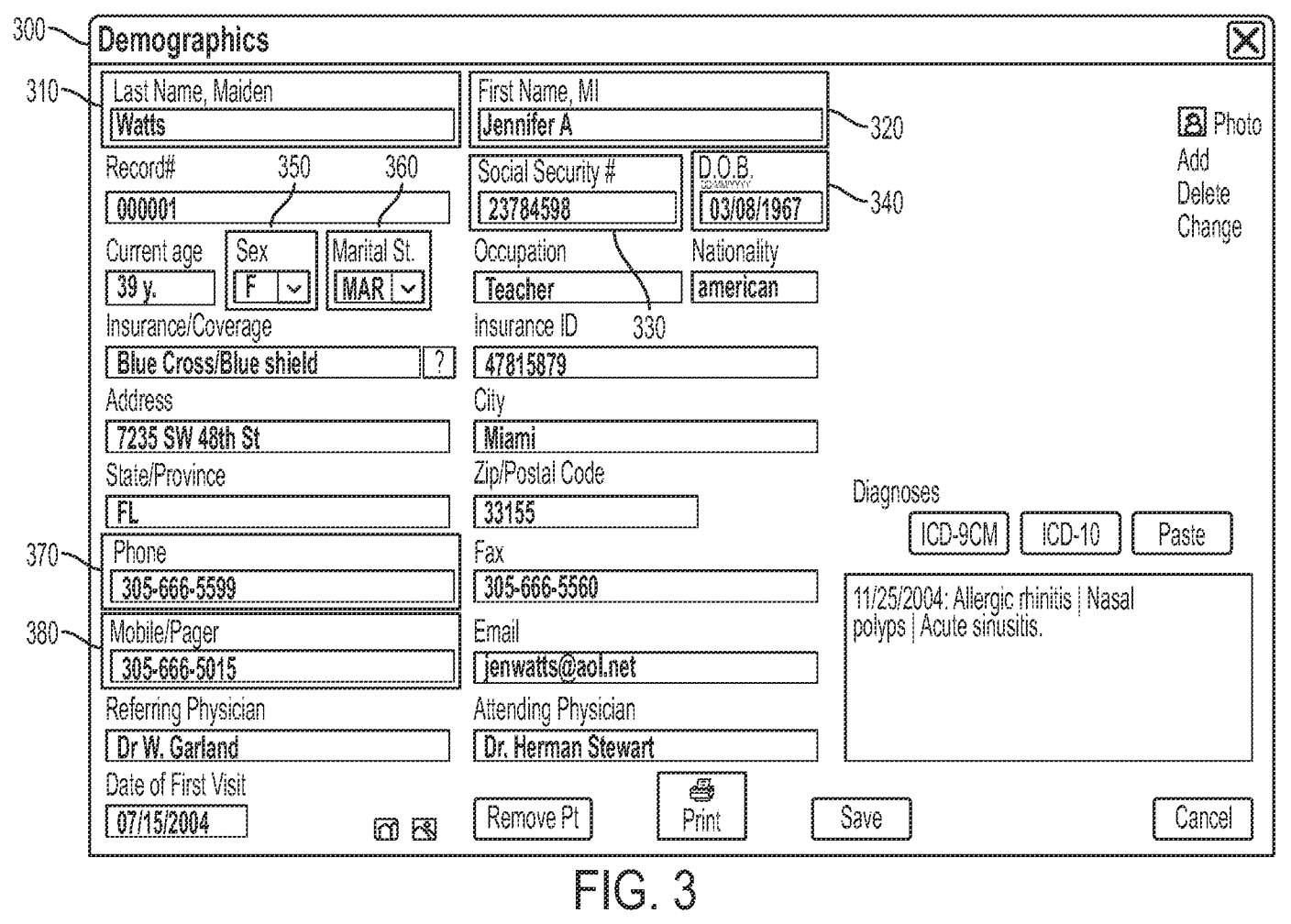

Demographics

| | | | |
|---|---|---|---|
| Last Name, Maiden | | First Name, MI | |
| Watts | | Jennifer A | |
| Record# | Sex | Marital St. | Social Security # | D.O.B |
| 000001 | F | MAR | 23784398 | 03/08/1967 |
| Current age | | Occupation | Nationality |
| 39 y. | | Teacher | american |
| Insurance/Coverage | | Insurance ID | |
| Blue Cross/Blue shield | | 47815879 | |
| Address | | City | |
| 7235 SW 48th St | | Miami | |
| State/Province | | Zip/Postal Code | |
| FL | | 33155 | |
| Phone | | Fax | |
| 305-666-5599 | | 305-666-5560 | |
| Mobile/Pager | | Email | |
| 305-666-5015 | | jenwatts@aol.net | |
| Referring Physician | | Attending Physician | |
| Dr W. Garland | | Dr. Herman Stewart | |
| Date of First Visit | | | |
| 07/15/2004 | | | |

Photo
Add
Delete
Change

Diagnoses
ICD-9CM  ICD-10  Paste
11/25/2004: Allergic rhinitis | Nasal polyps | Acute sinusitis.

Remove Pt  Print  Save  Cancel

FIG. 3

SYSTEM FOR AUTOMATICALLY FILLING IN PAPER FORMS WITH ELECTRONIC DATA

RELATED APPLICATION

The subject matter of this application is related to the subject matter of the following applications:

U.S. patent application Ser. No. 12/823,939, entitled "Spatial Association Between Virtual and Augmented Reality," by inventors Michael Roberts, James M. A. Begole, Maurice K. Chu, and Doron Kletter, filed 25 Jun. 2010;

U.S. patent application Ser. No. 12/163,186, entitled "System and Method for Finding a Picture Image in an Image Collection Using Localized Two-Dimensional Visual Fingerprints," by inventor Doron Kletter, filed 27 Jun. 2008;

U.S. patent application Ser. No. 12/147,867, entitled "System and Method for Finding Stable Keypoints in a Picture Image Using Localized Scale Space Properties," by inventor Doron Kletter, filed 27 Jun. 2008;

U.S. patent application Ser. No. 12/147,624, entitled "Method and System for Finding a Document Image in a Document Collection Using Localized Two-Dimensional Visual Fingerprints," by inventors Doron Kletter, Eric Saund, William C Janssen Jr., and Russell R Atkinson, filed 27 Jun. 2008;

the disclosures of which are incorporated by reference in their entirety herein.

BACKGROUND

1. Field

This disclosure is generally related to filling paper forms with electronic data. More specifically, this disclosure is related to schema mapping between fields in a paper form and an online data record, automatically retrieving the values from the online data record, and synthesizing the retrieved values to create an image of the paper form with filled-in values.

2. Related Art

Electronic data records are increasingly used in industries that conventionally relied heavily on paper records. For example, in the health care industry, many hospitals and medical offices now maintain electronic health records of patients. Nevertheless, due to various reasons such as regulatory requirements, paper forms are still mandatory in many situations. For instance, patients are usually asked to fill out a medical history form prior to each office visit. Such form often cannot be waived even though the patients already have visited the same office and have filled out the same form in the past. Because filling out these paper forms takes extra time, the patients are often advised to arrive at the office earlier than their scheduled appointment times in order to leave sufficient time for filling out paper forms.

To reduce the waiting time at the medical office, many medical offices send forms to patients in advance of their scheduled appointments and request patients to bring the filled-in form when they visit the office. However, patients still need to fill out the forms by hand. On the other hand, most information needed to fill out the paper forms is retrievable from the patient's electronic data record. Thus, it is advantageous to leverage the information from the electronic data records in order to improve the efficiency of paper form filling.

SUMMARY

One embodiment of the present disclosure provides a system for filling paper form with electronic data. During operation, the system receives a scanned image of a paper form that includes a plurality of fields. The system then retrieves a schema map that maps the plurality of fields in the paper form to a plurality of fields in an electronic data record associated with a user. Next, the system retrieves data values of the fields in the electronic data record based on the schema map. The system also synthesizes the retrieved data values and the scanned image to create an image of the paper form in which the fields are filled with the retrieved data values.

In a variation on this embodiment, the system determines whether a schema map corresponding to the paper form is available. If the schema map is not available, the system prompts the user to create the schema map, and generates the schema map based on the user's response.

In a variation on this embodiment, the system prompts the user to create the schema map by: prompting the user to define an area in the scanned image corresponding to a respective field of the paper form; converting information in the user-defined area from the image to text; selecting from the electronic data record a number of fields that are likely to correspond to the field of the paper form based on the converted text; suggesting to the user the selected fields as choices for the corresponding field in the electronic data record; and receiving a field selection from the user.

In a variation on this embodiment, the system prompts the user to enter a value for the field in the paper form in response to a respective field in the paper form being not included in the schema map. The system further synthesizes the value received from the user into the image of the paper form in which the fields are filled.

In a variation on this embodiment, the system prompts the user to enter a value for the field in the paper form in response to the value corresponding to a respective field in the paper form not being successfully retrieved from the electronic data record. The system further synthesizes the value received from the user into the image of the paper form in which the fields are filled.

In a variation on this embodiment, the system synthesizes the retrieved data values and the scanned image by converting each retrieved data value to an image of the data value, and overlaying the image of the data value transparently over the scanned image of the paper form.

In another variation on this embodiment, the system also adjusts the size and the position of the image of the data value based on the schema map.

BRIEF DESCRIPTION OF THE FIGURES

FIG. 2 presents a diagram illustrating an exemplary paper form to be filled in accordance with one embodiment.

FIG. 3 presents a diagram illustrating an exemplary user interface displaying values associated with an electronic data record in accordance with one embodiment.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In embodiments of the present invention, the problem of filling out paper forms using electronic data records is solved by mapping schema of a paper form to the electronic data record and synthesizing values of the electronic data record to generate an image of the paper form with filled-in values.

Figure 1:
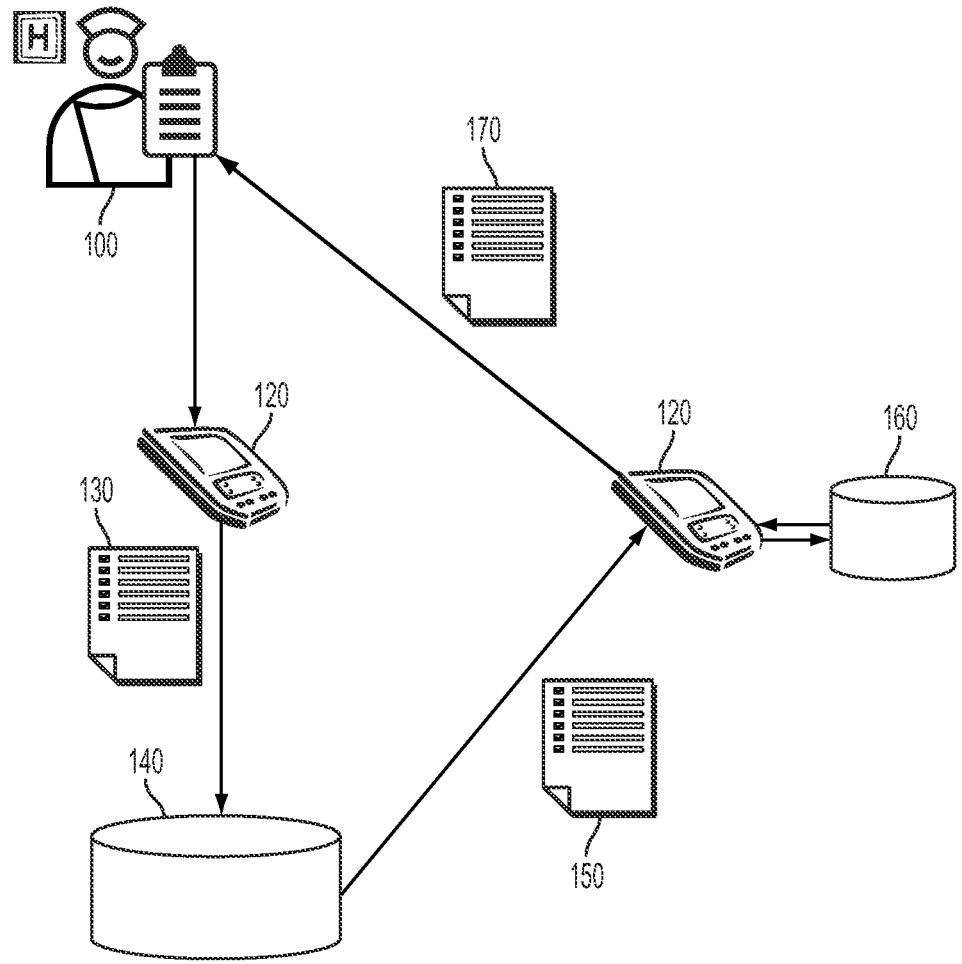
FIG. 1 presents a diagram illustrating a system environment for filling paper form with electronic data in accordance with one embodiment.

FIG. 1 presents a diagram illustrating a system environment for filling paper form with electronic data in accordance with one embodiment. The system environment described in FIG. 1 includes a portable device 120, a schema storage 140, and a data storage 160. Portable device 120 is capable of scanning an image of a paper form 130 or receiving a scanned image of paper form 130. Portable device 120 can also transmit image of a filled form 170 to another device for printing filled form 170 on paper. Schema storage 140 is used to store schema maps 150. Data storage 160 is used to store electronic data records which are used to fill paper form 130. Schema maps 150 are used to map fields of paper form 130 to fields in an electronic data record stored in data storage 160. Values from the fields in the electronic data record are retrieved and synthesized with the image of paper form 130 based on schema map 150 to create filled form 170. Filled form 170 is subsequently printed to create the paper form with filled-in values.

Paper Form

FIG. 2 presents a diagram illustrating an exemplary paper form to be filled in accordance with one embodiment. In this example, paper information form 200 includes a plurality of fields regarding a patient's personal information, such as patient name 210, date 220, etc., as well as a plurality of fields regarding the patient's health information, such as date of last dental visit 250, reason for this visit 260, survey of past medical history, etc.

Each field in patient information form 200 is associated with at least one label. However, some fields of paper information form 200 are associated with multiple labels. For example, the sex field on patient information form 200 includes two checkboxes with checkbox 230 associated with "Male" and checkbox 240 associated with "Female."

Values of the fields on patient information form 200 are filled differently based on the type of form elements associated with each field. For example, values for patient name 210 and date 220 are filled above the horizontal lines next to their corresponding labels. Value for the sex field is filled by placing a check mark in one of the checkboxes next to the labels "Male" or "Female." Field values regarding past medical history are filled by circling either "Y" (i.e., "Yes") or "N" (i.e., "No") next to each sub-field's label (e.g., AIDS/HIV 270, anemia 280, arthritis 290, etc.). Note that a field can have multiple sub-fields. For example, the medical history field may include information about the patient's past disease (e.g., AIDS/HIV 270, anemia 280, arthritis 290, etc.), treatments, pregnancies, and allergies.

Electronic Data Record

FIG. 3 illustrates an exemplary interface displaying values associated with an electronic data record. In this example, the electronic data record includes, among others, a patient's last name 310, first name and middle name initial 320, social security number 330, date of birth 340, sex 350, marital status 360, home address, phone number 370, mobile phone number 380, etc. Note that these fields also appear in the exemplary paper form illustrated in FIG. 2. Thus, the system can retrieve the values of the fields in the electronic data record and use the retrieved values to fill the paper form.

Paper form 200 may divide a field into different sub-fields from electronic data record 300. For example, patient name in paper form 200 includes three sub-fields, namely last name, first name, and middle name initial. However, in the electronic data record 300, the patient's name is divided into two different fields, i.e., last name field 310 and first name and MI field 320.

Moreover, data stored in the electronic data record may be associated with a format that does not satisfy the requirements of paper form 200. Assuming that paper form 200 requires the user to fill the social security number field following the format XXX-XX-XXXX, the value of the social security field in the electronic data record, however, may not have the hyphens. Also, values in the electronic data record may be abbreviated or stored in alternative representations, for example, "MAR" is used to indicate a married marital status.

In addition, ambiguities may arise from comparisons between fields in the electronic data record and fields in the paper form. For example, the electronic data record illustrated in FIG. 3 includes a phone field. However, paper form 200 includes separate sub-fields for home phone, work phone, and cell phone. Without additional user input, it can be difficult to determine which sub-field in the paper form that the value of the phone field in the electronic data record should be filled into.

Schema Map

Figure 4:
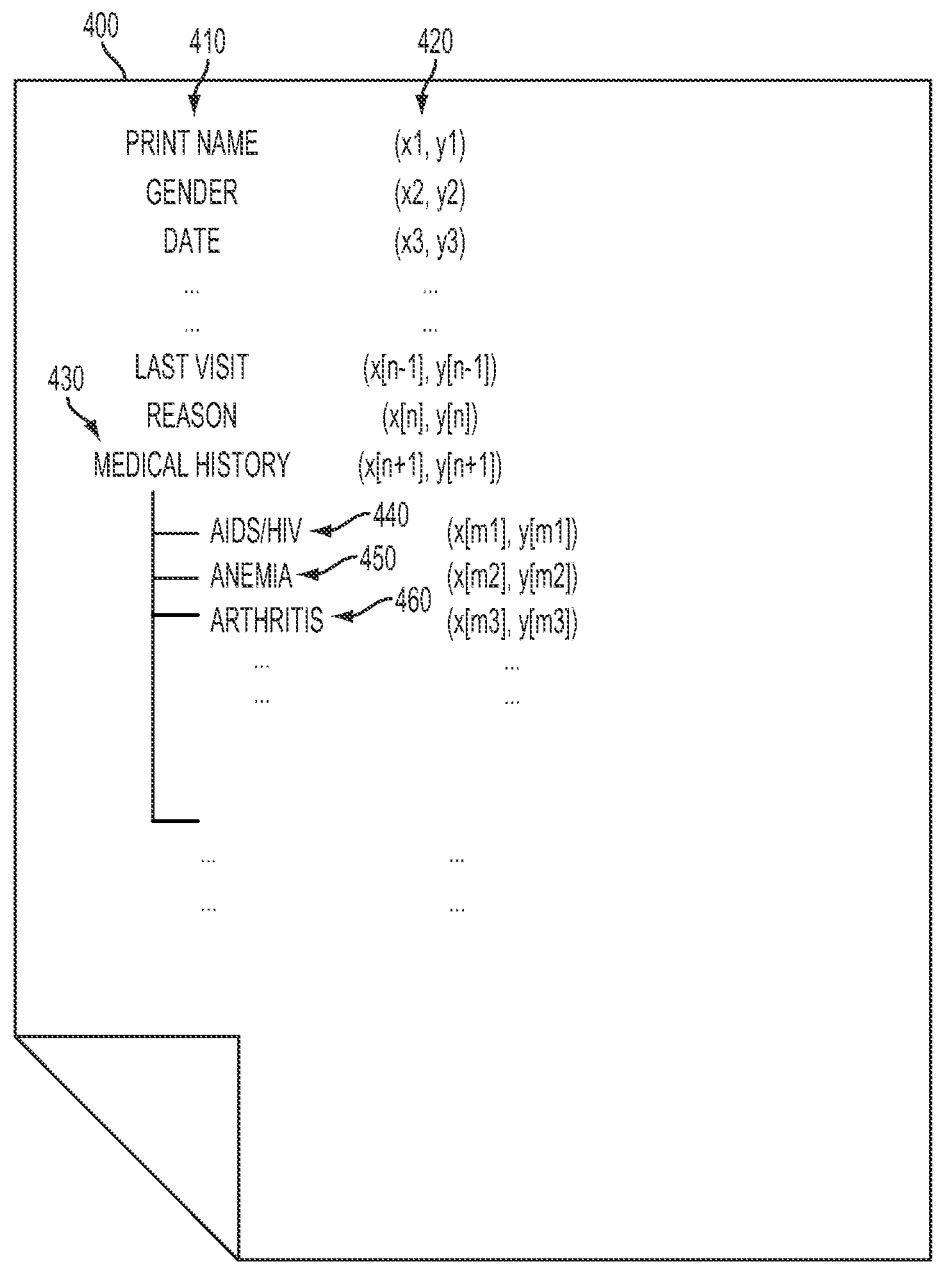
FIG. 4 presents a diagram illustrating an exemplary schema map between an electronic data record and a paper form in accordance with one embodiment.

FIG. 4 illustrates an exemplary schema map between an electronic data record and a paper form. In this example, a schema map 400 includes a plurality of identified areas 420 in the paper form, each corresponding to a field of the paper form. Schema map 400 also includes a plurality of fields 410 in the electronic data record. Thus, schema map 400 provides a mechanism for mapping fields from the paper form to the electronic data record.

In some embodiments, a field in the paper form or the electronic data record may have a plurality of sub-fields. For example, the field "Medical History" 430 may have multiple sub-fields, such as AIDS/HIV 440, Anemia 450, Arthritis 460, etc. Moreover, it is possible for multiple fields in the paper form to map to one field in the electronic data record, and vice versa. In some embodiments, a field in the paper form may not have a mapping field in the electronic data record. Thus, schema map 400 does not necessarily include all of the fields of the paper form.

If a schema map corresponding to a paper form does not pre-exist, the user of the paper form will be prompted to create schema map 400. For example, the user may be prompted to define an area in the scanned image corresponding to a field in the paper form on a touch screen. The system then converts information in the user-defined area from the image to text. Based on the converted text, the system can select from the electronic data record a number of fields that are likely to correspond to the user-defined field in the paper form. The system can suggest to the user the selected fields as choices for the corresponding field in the electronic data record. Furthermore, the system can receive a field selection from the user, and create an entry in schema map 400 associated with the field based on the user selection.

Alternatively, the system can extract field labels from the scanned image of the paper form, and search for corresponding fields in the electronic data record based on the extracted field labels. The system can present the suggested mapping to the user for confirmation, and then generate schema map 400 based on the user's response. Extracting field labels from the scanned image may utilize technologies such as optical character recognition (OCR), visual document comparison, etc.

When generating schema map 400, the system may compare a section of the paper form with other paper forms whose schema maps have been previously generated and stored in the schema storage. For example, both a hospital registration form and a patient survey required for each doctor visit may have a patient information section, which includes a number of common fields. The schema map for the hospital registration form has been created and stored in the schema storage. Thus, when creating the schema map for the patient survey, the system may compare the images of the two forms to find common fields and refer to the corresponding sections in the schema map for the hospital registration form to generate the mapping for the common fields in the patient survey.

Synthesizing Image of Paper Form

After a schema map for the paper form is generated or retrieved from schema storage, the system will access the electronic data record to retrieve the values of the corresponding fields based on the schema map associated with the paper form. The system then synthesizes the values of the fields into the scanned image of the filled-in form to generate an image of the paper form with filled-in values. In one embodiment, synthesizing the image may involve generating an image that includes a field value retrieved from the electronic data record, and overlaying the generated image onto the scanned image of the paper form at a location that corresponds to the field.

If a field in the paper form is not included in the schema map, the system may prompt the user to enter a value for the field of the paper form. The system then synthesizes the value received from the user into the image of the paper form in which the fields are filled.

Likewise, if a field in the paper form is included in the schema map, but the value of the field cannot be successfully retrieved from the electronic data record, the system may prompt the user to enter a value for the field of the paper form, and synthesize the value received from the user into the image of the paper form in which the fields are filled.

Automatic Paper Form Filling Process

Figure 5:
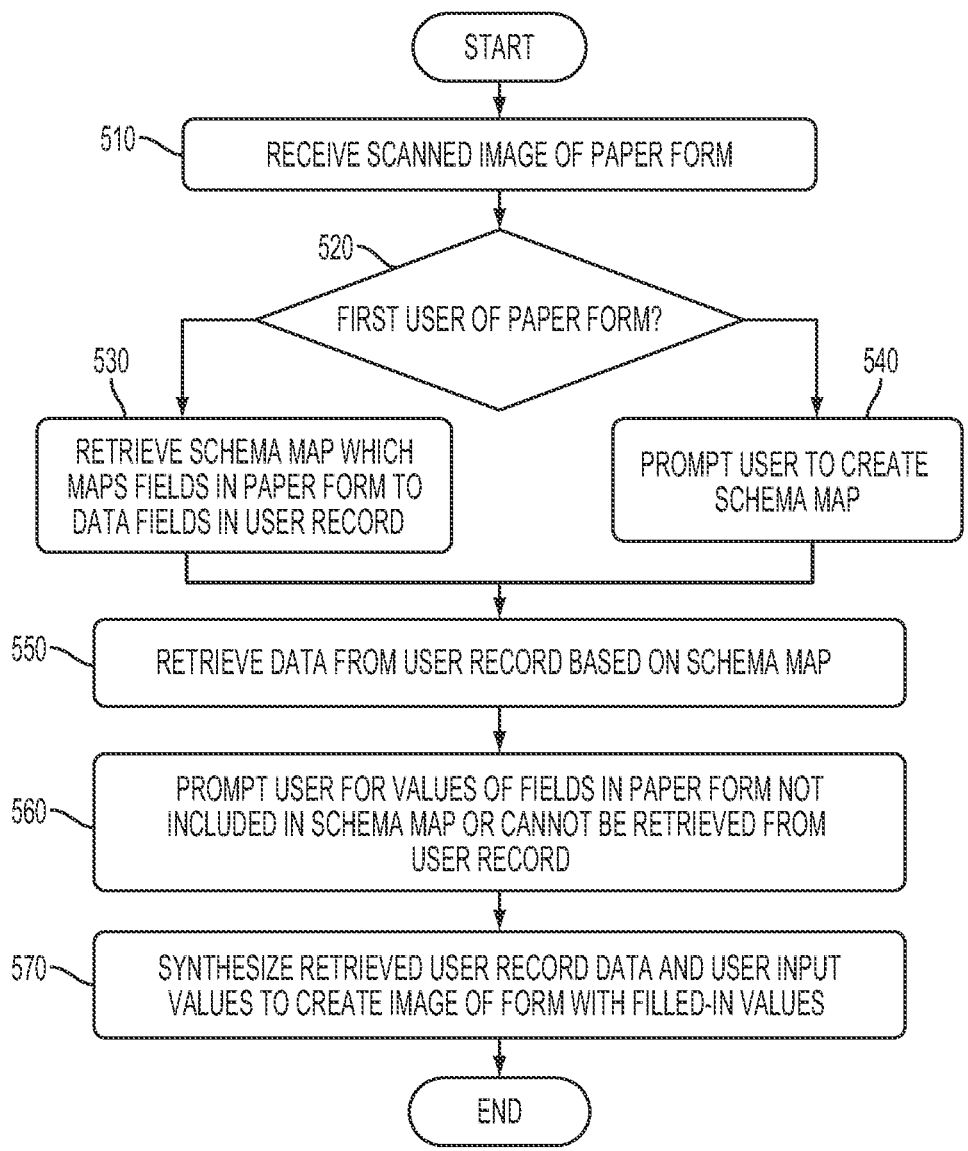
FIG. 5 presents a flowchart illustrating an exemplary process of filling paper form with electronic data in accordance with one embodiment.

FIG. 5 illustrates an exemplary process of automatically filling paper form with electronic data in accordance with an embodiment. During operation, the system first receives a scanned image of a paper form from a user (operation 510). Next, the system determines whether the user is the first user of the paper form. If the user is not the first user of the paper form, the schema map for the paper form is likely to have been generated by previous users of the paper form. Thus, the system will attempt to retrieve the corresponding schema map for the paper form (operation 530). The schema map maps fields in the paper form to data fields in an electronic data record associated with the user. Note that a field in the paper form or the electronic data record may have a plurality of sub-fields. Also, multiple fields in the paper form may map to one field in the electronic data record, and vice versa.

On the other hand, if the user is the first user of the paper form, the schema map for the paper form may not have been generated. Thus, the system will prompt the user to create a schema map (operation 540). To facilitate the creation of the schema map, the system can extract field labels from the scanned image of the paper form, search for mapping data fields in the electronic data record based on the extracted field labels, and suggest to the user results from the search as potential choices. The system may also compare the scanned image of the paper form with pre-existing paper form images and their corresponding schema maps to find common sections and/or fields.

After the schema map is generated or retrieved from the schema storage, the system will retrieve values of the data fields from the electronic data record associated with the user based on the schema map (operation 550). If a field of the paper form is not included in the schema map, or if the value of a field cannot be successfully retrieved from the electronic data record associated with the user, the system will prompt the user for the value of the field of the paper form (operation 560).

Figure 6:
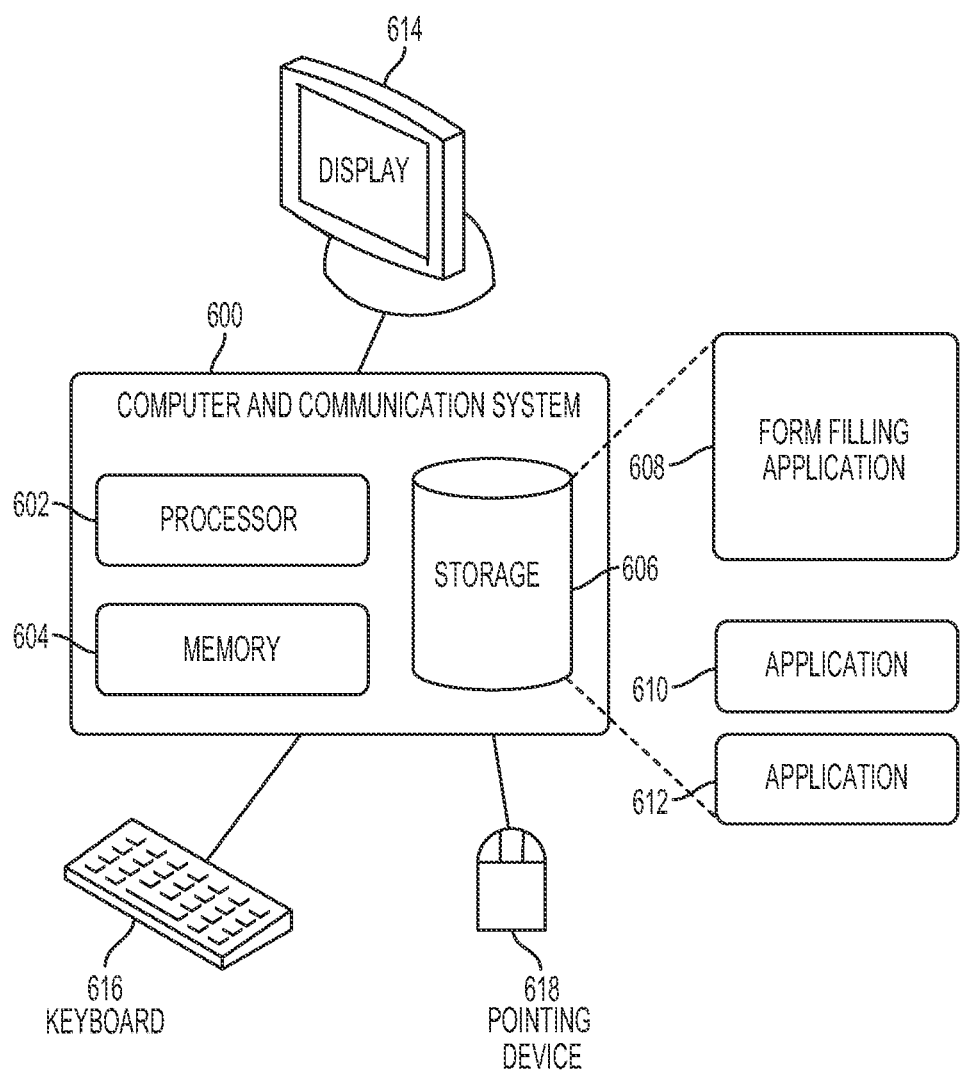
FIG. 6 presents a block diagram illustrating a computer system for filling paper form with electronic data in accordance with one embodiment.

Subsequently, the system synthesizes the values of data fields retrieved from the electronic data record and the values received from the user's response (if any) into the scanned image of the paper form, and creates an image of the paper form with filled-in values (operation 570). Note that synthesizing the image may involve generating an image that includes a field value retrieved from the electronic data record, and overlaying the generated image onto the scanned image of the paper form at a location that corresponds to the field Exemplary Automatic Paper Form Filling System FIG. 6 illustrates an exemplary computer system for estimating document similarity in accordance with one embodiment of the present invention. In one embodiment, a computer and communication system 600 includes a processor 602, a memory 604, and a storage device 606. Storage device 606 stores an automatic form filing application 608, as well as other applications, such as applications 610 and 612. During operation, automatic form filling application 608 is loaded from storage device 606 into memory 604 and then executed by processor 602. While executing the program, processor 602 performs the aforementioned functions. Computer and communication system 600 is coupled to an optional display 614, keyboard 616, and pointing device 618.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for automatically filling a paper form, comprising:
   receiving a scanned image of a paper form which comprises a plurality of fields;
   determining, by the computer, whether a schema map record for the paper form is available, wherein the schema map record includes mappings between a plurality of data-entry areas of the paper form that correspond to a plurality of fields in the paper form and a plurality of fields in an electronic data record associated with a user;
   in response to the schema map record not being available, interacting with the user to create the schema map record, wherein creating the schema map record involves:
      extracting field labels from the scanned image of the paper form;
      searching for data fields in the electronic data record based on the extracted field labels;
      identifying common fields between the scanned image of the paper form and schema maps for pre-existing paper form images;
      presenting, to the user, one or more potential mappings between the identified common fields of the paper form images and the data fields of the electronic data record; and
      generating the schema map record based on potential mappings selected by the user;
   retrieving data values, for the data-entry areas of the paper form, using fields of the electronic data record as determined based on the schema map record; and
   synthesizing the retrieved data values and the scanned image to create an image of the paper form in which the fields are filled with the retrieved data values.

2. The method of claim 1, further comprising:
   prompting the user to define a data-entry area in the scanned image corresponding to a respective field of the paper form;
   converting information in the user-defined data-entry area from the image to text;
   selecting from the electronic data record a number of fields that are likely to correspond to the field of the paper form based on the converted text;
   suggesting to the user the selected fields as choices for the corresponding field in the electronic data record; and
   receiving a field selection from the user, wherein the field selection includes one or more of the selected fields from the electronic data record.

3. The method of claim 1, further comprising:
   in response to a respective field in the paper form not being included in the schema map record, prompting the user to enter a value for the field in the paper form; and
   synthesizing the value received from the user into the image of the paper form in which the fields are filled.

4. The method of claim 1, further comprising:
   in response to the value corresponding to a respective field in the paper form not being successfully retrieved from the electronic data record, prompting the user to enter a value for the field in the paper form; and
   synthesizing the value received from the user into the image of the paper form in which the fields are filled.

5. The method of claim 1, wherein synthesizing the retrieved data values and the scanned image comprises:
   converting each retrieved data value to an image of the data value; and
   overlaying the image of the data value transparently over the scanned image of the paper form.

6. The method of claim 5, further comprising:
   adjusting the size and the position of the image of the data value based on the schema map record.

7. A non-transitory computer-readable storage medium storing instructions that when executed by a computer cause the computer to perform a method for automatically filling out paper forms, the method comprising:
   receiving a scanned image of a paper form which comprises a plurality of fields;
   determining whether a schema map record for the paper form is available, wherein the schema map record includes mappings between a plurality of data-entry areas of the paper form that correspond to a plurality of fields in the paper form and a plurality of fields in an electronic data record associated with a user;
   in response to the schema map record not being available, interacting with the user to create the schema map record, wherein creating the schema map record involves:
      extracting field labels from the scanned image of the paper form;
      searching for data fields in the electronic data record based on the extracted field labels;
      identifying common fields between the scanned image of the paper form and schema maps for pre-existing paper form images;
      presenting, to the user, one or more potential mappings between the identified common fields of the paper form images and the data fields of the electronic data record; and
      generating the schema map record based on potential mappings selected by the user;
   retrieving data values, for the data-entry areas of the paper form, using fields of the electronic data record as determined based on the schema map record; and
   synthesizing the retrieved data values and the scanned image to create an image of the paper form in which the plurality of fields are filled with the retrieved data values.

8. The non-transitory computer-readable storage medium of claim 7, wherein the method further comprises:
   prompting the user to define a data-entry area in the scanned image corresponding to a respective field of the paper form;
   converting information in the user-defined data-entry area from the image to text;
   selecting from the electronic data record a number of fields that are likely to correspond to the field of the paper form based on the converted text;
   suggesting to the user the selected fields as choices for the corresponding field in the electronic data record; and
   receiving a field selection from the user, wherein the field selection includes one or more of the selected fields from the electronic data record.

9. The non-transitory computer-readable storage medium of claim 7, wherein the method further comprises:
in response to a respective field in the paper form not being included in the schema map record, prompting the user to enter a value for the field in the paper form; and
synthesizing the value received from the user into the image of the paper form in which the plurality of fields are filled.

10. The non-transitory computer-readable storage medium of claim 7, wherein the method further comprises:
in response to the value corresponding to a respective field in the paper form not being successfully retrieved from the electronic data record, prompting the user to enter a value for the field in the paper form; and
synthesizing the value received from the user into the image of the paper form in which the plurality of fields are filled.

11. The non-transitory computer-readable storage medium of claim 7, wherein synthesizing the retrieved data values and the scanned image comprises:
converting each retrieved data value to an image of the data value; and
overlaying the image of the data value transparently over the scanned image of the paper form.

12. The non-transitory computer-readable storage medium of claim 11, wherein the method further comprises:
adjusting the size and the position of the image of the data value based on the schema map record.

13. A system, comprising:
a processor;
a memory;
a receiving mechanism configured to receive a scanned image of a paper form which comprises a plurality of fields;
a determining mechanism configured to determine whether a schema map record for the paper form is available, wherein the schema map record includes mappings between a plurality of data-entry areas of the paper form that correspond to a plurality of fields in the paper form and a plurality of fields in an electronic data record associated with a user,
a schema generating mechanism configured to create the schema map record by interacting with the user in response to the schema map record not being available, wherein creating the schema map record involves:
extracting field labels from the scanned image of the paper form;
searching for data fields in the electronic data record based on the extracted field labels;
identifying common fields between the scanned image of the paper form and schema maps for pre-existing paper form images;
presenting, to the user, one or more potential mappings between the identified common fields of the paper form images and the data fields of the electronic data record; and
generating the schema map record based on potential mappings selected by the user;
wherein the retrieving mechanism is further configured to retrieve data values, for the data-entry areas of the paper form, using fields of the electronic data record as determined based on the schema map record; and
a synthesizing mechanism configured to synthesize the retrieved data values and the scanned image to create an image of the paper form in which the plurality of fields are filled with the retrieved data values.

14. The system of claim 13, the schema generating mechanism is further configured to:
prompt the user to define a data-entry area in the scanned image corresponding to a respective field of the paper form;
convert information in the user-defined data-entry area from the image to text;
select from the electronic data record a number of fields that are likely to correspond to the field of the paper form based on the converted text;
suggest to the user the selected fields as choices for the corresponding field in the electronic data record; and
receive a field selection from the user, wherein the field selection includes one or more of the selected fields from the electronic data record.

15. The system of claim 13,
wherein the schema generating mechanism is further configured to prompt the user to enter a value for the field in the paper form in response to a respective field in the paper form not included in the schema map record; and
wherein the synthesizing mechanism is further configured to synthesize the value received from the user into the image of the paper form in which the plurality of fields are filled.

16. The system of claim 13,
wherein the schema generating mechanism is further configured to prompt the user to enter a value for the field in the paper form in response to the value corresponding to a respective field in the paper form not being successfully retrieved from the electronic data record; and
wherein the synthesizing mechanism is further configured to synthesize the value received from the user into the image of the paper form in which the plurality of fields are filled.

17. The system of claim 13, wherein the synthesizing mechanism is further configured to:
convert each retrieved data value to an image of the data value; and
overlay the image of the data value transparently over the scanned image of the paper form.

18. The system of claim 17, wherein the synthesizing mechanism is further configured to adjust the size and the position of the image of the data value based on the schema map record.

* * * * *